United States Patent
Wong

(10) Patent No.: US 7,785,646 B2
(45) Date of Patent: Aug. 31, 2010

(54) METHOD FOR DRYING A SACCHAROSE SOLUTION, PRODUCT THUS OBTAINED AND USE THEREOF

(75) Inventor: Emile Wong, Neyron (FR)

(73) Assignee: Beghin-Say, Thumeries (FR)

( * ) Notice: Subject to any disclaimer, the term of this patent is extended or adjusted under 35 U.S.C. 154(b) by 1274 days.

(21) Appl. No.: 10/481,790

(22) PCT Filed: Jun. 26, 2002

(86) PCT No.: PCT/FR02/02215

§ 371 (c)(1),
(2), (4) Date: Jun. 2, 2004

(87) PCT Pub. No.: WO03/000936

PCT Pub. Date: Jan. 3, 2003

(65) Prior Publication Data

US 2004/0208981 A1  Oct. 21, 2004

(30) Foreign Application Priority Data

Jun. 26, 2001  (FR) .................................. 01 08406

(51) Int. Cl.
*A23G 3/00*  (2006.01)
*C13F 3/00*  (2006.01)

(52) U.S. Cl. ........................................ 426/658; 127/29

(58) Field of Classification Search ................. 426/659; 127/30, 42, 58–60, 2
See application file for complete search history.

(56) References Cited

U.S. PATENT DOCUMENTS 3,642,535 A  *  2/1972  Graham et al. ................. 127/29
3,735,792 A       5/1973  Asizawa et al.
4,013,775 A  *  3/1977  Nelson et al. ................ 426/285
4,159,210 A  *  6/1979  Chen et al. .................... 127/29
2001/0031734 A1 * 10/2001  Tanno et al. ................... 514/23

FOREIGN PATENT DOCUMENTS

| EP | 0352393 A1 * | 12/1988 |
| EP | 0 335 852 | 10/1989 |
| GB | 952 640 | 3/1964 |
| GB | 1 240 691 | 7/1971 |

OTHER PUBLICATIONS

Kathleen E. Bowe; Recent Advances in Sugar based Excipients, Elsevier Science, Nov. 1998, 20 pages.*
http://www.asiinstr.com/technical/Material_Bulk_Density_Chart_S.htm, Bulk Density Specific Gravity Chart, May 21, 2009, pp. 3.*
http://www.azom.com/details.asp?ArticleID=1417, Particle Size—US Sieve Series and Tyler Mesh Size Equivalents, printed Nov. 5, 2009, 3 pages.*

* cited by examiner

*Primary Examiner*—Keith D Hendricks
*Assistant Examiner*—Jyoti Chawla
(74) *Attorney, Agent, or Firm*—Young & Thompson

(57) ABSTRACT

The invention relates to a compressible, powdery sugar composition having an apparent density of more than 0.5, especially 0.6 and approximately 0.8, preferably equal to 0.6, said composition consisting of hollow particles. The invention also relates to a method for preparing a compressible sugar solution, comprising a drying stage involving the atomization of an initial saccharose solution with at least one added anti-crystallizing agent, wherein the saccharose content of the initial saccharose solution is lower than the saturation rates, advantageously exhibiting a dry matter rate of approximately 60 wt. % in relation to the total weight of the composition.

7 Claims, 9 Drawing Sheets

METHOD FOR DRYING A SACCHAROSE SOLUTION, PRODUCT THUS OBTAINED AND USE THEREOF

The invention relates to a process for drying a sucrose solution, as well as the product obtained according to said process. The invention also relates to the use of said product, for example, for the preparation of tablets and confectionery.

Drying of a sucrose solution can be carried out by atomization, a process well known in the prior art.

Patent GB 1,350,098 can therefore be mentioned, which relates to a spray-drying process for obtaining powdery particles from stock solutions, and in particular from sucrose solutions. The process used in this patent requires the maintenance in suspension of small crystals in the solution and makes it possible to obtain a non-compressible sugar.

Patent GB 1,240,691 relates to a process for producing a non-compressible solid sugar composition which comprises the spray-drying of a sucrose syrup with an inverted sugar content below 10% by mass and an inorganic ash content below 4% by mass. In this process, the atomized syrup drops are dried by hot air. The starting syrup used in this process is highly concentrated and beyond saturation. The recycling of the powder as crystallization primer is important. Moreover, the residual humidity percentage of the product obtained is above 1%.

At present, the main directly compressible sugars commercially available are Dipac®, Nutab® and Alvéo-sucre®.

Dipac® is obtained by concentration of a sugar solution containing additives. The process for obtaining this sugar consists of solidifying, by mechanical stirring, a supersaturated sucrose solution. The crystals which appear in the solution become agglomerated between themselves as the paste solidifies. This is therefore a phenomenon of in situ agglomeration of crystals.

Nutab® is obtained by compacting a mixture of sugar powder, inverted sugar and starch.

As for Alvéo-sucre®, this is obtained by humid granulation of a mixture of sugar and maltodextrins.

One of the aspects of the present invention is to provide a sugar with improved performances compared with those of sugars of the prior art, making it possible to obtain tablets requiring lower compression forces and ejection forces than those used with the tablets obtained from compressible sugars of the prior art, whilst using the same quantity of lubricant.

One of the aspects of the present invention is to provide a directly compressible sugar, obtained by a spray-drying process, said process being carried out with standard atomizers, and therefore not requiring a specific installation, unlike the process for obtaining certain directly compressible sugars of the prior art.

One of the other aspects of the present invention is to provide a directly compressible sugar, having flow properties favourable to compression.

One of the other aspects of the present invention is to provide a process for drying a sucrose solution which makes it possible to pass from a liquid state to a powdery and dry state, rendering the sugar ready for use and making it possible to vary the granulometric distribution of the particles forming the sugar composition, according to the atomization conditions, and to control the size of the crystals obtained, which make up the particles of the sugar composition.

According to its more general aspect, the invention relates to a compressible powdery sugar composition, made up of particles presented in hollow form.

The invention relates to a powdery composition of compressible sugar having an apparent density greater than approximately 0.5, and in particular comprised between approximately 0.6 and approximately 0.8, and preferably equal to approximately 0.6, said composition being made up of particles presented in hollow form.

The expression "powdery sugar composition" designates dry sugar crystals agglomerated into particles, themselves being able to be agglomerated between themselves.

The expression "compressible" designates the ability of a powder to produce tablets of regular size, shape and weight leaving a tablet press.

A directly compressible sugar is a sugar in powdery form which allows the production of tablets. It is obtained according to the following stages: the powdery composition is mixed with the other ingredients (flavourings, colorants, active ingredients, lubricants etc.) then the tablets are produced by compressing the abovementioned mixture obtained previously in three phases (precompression-compression-ejection).

The powdery composition of sugar obtained according to the invention is compressible, it can therefore be used for the preparation of tablets. However, this property of the sugar composition in no event limits its use in the production of tablets.

The expression "apparent density" designates the measured density of the powder; it is therefore the ratio between the mass of the powder and the volume occupied by the powder. This apparent density contrasts with the true density of the powder, which corresponds to the ratio between the mass of the powder and the volume completely filled by said powder without any volume of air. The term "degree of compaction" of a powder designates the ratio between the density of the tablet and the true density of the powder.

This apparent density can be measured by weighing a known volume of powder.

The sugar composition according to the invention has an apparent density greater than that of the non-compressible sugars of the prior art, obtained by spray-drying, which have a relatively low density, of the order of 0.45.

This makes it possible to reduce the stroke of the punches of the tablet press for the compression phase and to reduce the size of the cells of the tablet press.

The invention relates to a powdery sugar composition as defined above, comprising:
  sucrose amounting to approximately 90% to approximately 99% by weight, with respect to the total weight of the composition,
  at least one anti-crystallizing agent amounting to approximately 1% to approximately 10% by weight, with respect to the total weight of the composition,
  and optionally additives chosen from flavourings, colorants or active ingredients.

The anti-crystallizing agent is a binding agent which allows the sugar crystals to stick to one another. It interferes with the sucrose and slows down the crystallization rate of the latter. If the quantity of anti-crystallizing agent is too great, the drying time is longer and the powdery composition obtained sticks to the walls of the drying device.

The anti-crystallizing agent moreover has the advantage of increasing the solubility of the components of the sucrose solution.

Intense sweetening agents such as-aspartame are excluded from the definition of anti-crystallizing agent.

The invention relates to a powdery sugar composition as defined above, characterized in that the anti-crystallizing agent is chosen from inverted sugar, the maltodextrins, monosaccharides, oligosaccharides and polyols.

As anti-crystallizing agents, inverted sugar and raffinose, which is an oligosaccharide, are chiefly used, these two compounds being known for their ability to slow down the crystallization rate of sucrose (Beet Sugar Technology, $3^{rd}$ Edition, published by Beet Sugar Development Foundation, 1982), as well as the maltodextrins.

The invention also relates to a powdery sugar composition as defined above, comprising a lubricant chosen from fatty substances, such as magnesium stearate, stearic acid, or from the following compounds: sodium benzoate and colloidal silica, amounting to approximately 0.1% to approximately 1% with respect to the total weight of the composition.

The lubricant serves to avoid sticking between the tablet obtained after compression of the abovementioned powdery sugar composition and the elements of the tablet press used in order to produce the tablets. It therefore makes it possible to reduce friction during the tablet ejection phase but it has a negative impact on cohesion, i.e. on the hardness of the tablet.

A lubricant is used only during the compression of the powdery composition according to the invention. The addition of the lubricant allows the tablet obtained to slide better: it is therefore easier to recover it. It is mixed with the powdery composition according to the invention but is not present in the initial sucrose solution. This compound is relatively insoluble in the solution and if it were present in the solution, it would disturb the formation of the powder.

According to an advantageous embodiment of the invention, the powdery sugar composition according to the invention, as defined above, is characterized in that it can be compressed, the hardness of the compressed powder obtained from the powdery composition being greater than approximately 2 MPa, said hardness being measured for a compression force greater than approximately 10 kN, and the compressed powder responding to an ejection force comprised from approximately 80 to approximately 180 N, and preferably equal to 150 N, said ejection force being measured for a compression force comprised from approximately 15 to approximately 20 kN.

To give a firm idea, hardness can be comprised from approximately 2 to approximately 5 MPa. In the above and hereafter, hardness corresponds to resistance.

The hardness of the tablets obtained is measured according to the method described in the European Pharmacopoeia, Chapter 2.9.8 (1997).

The mechanism used to compress the sugar composition according to the invention is a tablet press made up of two punches, a lower punch and an upper punch, and the powder is compressed between these two punches.

The ejection force is then the force that must be applied to the lower punch in order to release the tablet.

The values measured with the powders of the invention are indicated in graphs and compared in the same graphs to the values obtained with the powders of the prior art (see FIGS. 6 to 9). The hardness of the compressed powder obtained according to the invention is measured according to the abovementioned standard test and the ejection forces are values recorded on the lower punches of the tablet press mentioned below.

It is found that the tablets obtained from the powdery composition according to the invention have an average hardness greater than 80% of that of the tablets obtained from Dipac® directly compressible sugar and an ejection force below 50% of that of the tablets obtained from Dipac® directly compressible sugar.

The invention also relates to a powdery sugar composition as defined above, characterized in that it has a residual humidity level equal to or less than 1% by weight, with respect to the total weight of the composition.

This residual humidity level is measured by a Karl Fischer assay.

A residual humidity level, equal to or less than 1%, corresponds to the equilibrium humidity level of the powder obtained under normal atmospheric conditions (20-30° C., 50-60% of relative hygrometry).

If the residual humidity level is greater than 1%, this more humid powder is unstable and has a tendency to lose humidity in order to reach its equilibrium humidity.

The invention also relates to a particle forming part of the sugar composition as defined above, characterized in that it is presented in hollow form, and the surface of which is essentially made up of a skeleton formed by two types of crystals, said skeleton being made up of a first type of crystals forming interstices in which are situated the crystals making up the second type of crystals, the crystal size of the first type of crystals being in particular greater than approximately 5 μm, and comprised in particular from approximately 10 to approximately 30 μm, and the crystal size of the second type of crystals being lower than 5 μm, and in particular lower than 1 μm, and advantageously comprised from approximately 0.1 μm to approximately 2 μm.

Detailed observation of the structure of the particles of hollow spherical shapes forming part of the sugar composition according to the invention shows that the fine structure of said particles is made up of a framework of crystals larger than approximately 15 μm, surrounded by much finer crystals, smaller than approximately 5 μm (see FIG. 4).

The presence of anti-crystallizing agent allows the formation of this structure, and in particular the presence of the small crystals.

The invention also relates to granules made up of particles as defined above, agglomerated between themselves, said granules having an average size comprised from approximately 40 to approximately 350 μm.

Said granules are therefore made up of particles which form the powdery sugar composition according to the invention.

The invention also relates to a process for preparing a compressible sugar composition, comprising a stage of spray-drying of an initial sucrose solution to which at least one anti-crystallizing agent has been added, in which the initial sucrose solution has a sucrose content lower than the saturation level, and advantageously has a dry matter content of approximately 60% by weight.

The term "saturation level of the solution" designates the ratio between the sucrose concentration and the solubility limit of sucrose in water at the temperature under consideration.

When the solution's saturation level is equal to 1, the solubility limit of the sucrose is reached; when this value is greater than 1, the solution is in a metastable state and the sucrose solution is supersaturated.

The dry matter content of a product corresponds to the percentage of dry extract of said product. For sugar syrups, this content is generally expressed in degrees Brix, and corresponds to the mass of dry extract in g for 100 g of solution.

According to an advantageous embodiment of the invention, the process, as defined above, is characterized in that the anti-crystallizing agent is chosen from the monosaccharides, oligosaccharides and polysaccharides, or is a mixture of inverted sugar and maltodextrins.

Glucose and fructose can be mentioned as monosaccharides, maltose, lactose, raffinose, the malto-oligosaccharides and fructo-oligosaccharides as oligosaccharides, and gum arabic, the glucanes, galactomananes, galactanes and fructanes as polysaccharides.

According to an advantageous embodiment of the invention, the process, as defined above, is characterized in that part of the sugar composition obtained is recycled as crystallization primer, in a quantity lower than approximately 60% by weight, preferably lower than approximately 30%, with respect to the total weight of the composition.

The expression "crystallization primer" or seeds designates crystals which allow the crystallization of the sucrose, by contact with the powder during drying, this powder being somewhat amorphous. This crystallization primer makes it possible to obtain a dry and stable solid.

The expression "part of the sugar composition" designates the fraction of powder produced by drying which must be recycled for drying efficiency. The more seed crystals there are, the more rapid the crystallization, by multiplication of the number of resultant crystals.

The more powder is recycled, the more rapid the drying of the solution droplets.

According to an advantageous embodiment of the invention, the process, as defined above, comprises the following main stages:
 the atomization into fine drops of a sucrose solution, containing at least one anti-crystallizing agent, under a flow of recycled sugar composition, said recycled sugar composition serving as crystallization primer,
 the drying of the drops thus obtained by hot air, leading to the production of hollow particles,
 the maturation of the hollow particles obtained in the previous stage, consisting of the continuation of drying, until a residual humidity lower than 1% by weight is obtained, with respect to the total weight of the sugar composition.

The expression "sucrose solution" designates the initial solution in which sucrose represents from 90 to 99% of the dry matter.

The expression "atomization into fine drops" designates the conversion of the sucrose solution into droplets by means of nozzles or turbines.

The drying stage consists of drying the drops formed by atomization during the previous stage into solid particles with a stream of hot air.

The hot air used to dry the drops obtained in the stage corresponding to the atomization is at a temperature of 120 to 200° C. The hot air inlet temperature must be fixed on the basis of the flow rate of the sucrose solution introduced. The higher the flow rate, the higher the temperature must be due to a greater requirement for thermal energy in order to carry out the drying.

The powdery composition outlet temperature is approximately 85° C.

The term "maturation" designates the continuation of the drying until a residual humidity is obtained approaching equilibrium humidity under the product's normal storage conditions.

If the residual humidity level is higher than 1%, the product obtained is an unstable product which continues to lose water, and this water can condense on any colder wall. This phenomenon generally leads to caking.

This characteristic is fundamental as it conditions the powder's ability to remain powdery and retain its fluidity. For a directly compressed powder, this parameter directly influences the tablets' regularity by weight and density. Thus, a powder that is too humid very rapidly increases the ejection forces of the tablets and the fouling of the equipment.

The invention also relates to the process as defined above, in which an initial agent serving as crystallization primer is used, in particular icing sugar.

The expression "initial agent serving as crystallization primer" designates a compound which serves to initiate crystallization during drying, until no more powder obtained according to the process of the invention is available.

As crystallization agent, in particular icing sugar or any other very fine sugar crystal is used, comprising crystals smaller than 200 μm.

The invention also relates to the process as defined above, in which icing sugar is not used as crystallization primer, when the sugar composition has been obtained in sufficient quantity to be used in part as crystallization primer.

Generally the powdery sugar compositions containing approximately more than 10% of crystallization primer are removed, for example the icing sugar.

The invention also relates to the process as defined above, in which the icing sugar is not used when the quantity of sugar obtained is approximately at least equal to five times the quantity of icing sugar initially used as crystallization primer.

The invention also relates to a compressible powdery sugar composition as obtained by the process as defined above.

The invention also relates to the use of a compressible powdery sugar composition as defined above, for the preparation of tablets or confectionery.

Rectangle A corresponds to the stage of addition of the initial mixture, comprising sucrose and at least one anti-crystallizing agent, this stage: being followed by the atomization stage corresponding to Rectangle B, and the powder and fine particle recycling stages, corresponding to Rectangles C and D respectively. The atomization stage (Rectangle B) takes place in the drying tower (Circle 1) and the particles obtained are recovered in the first fluidized bed (circle 2), Circle 3 representing the inlet of the air used in this first fluidized bed. The product leaving this first fluidized bed is matured in a second fluidized bed (Circle 4), Circle 5 corresponding to the inlet of the air in this second fluidized bed and Circle 6 to its outlet. Circle 7 represents the air inlet into the drying tower (Circle 1). The fine particles to be recycled (Rectangle D) are recovered in the cyclone, corresponding to Circle 8, Circle 9 corresponding to the outlet of the air out of said cyclone.

Figure 3:
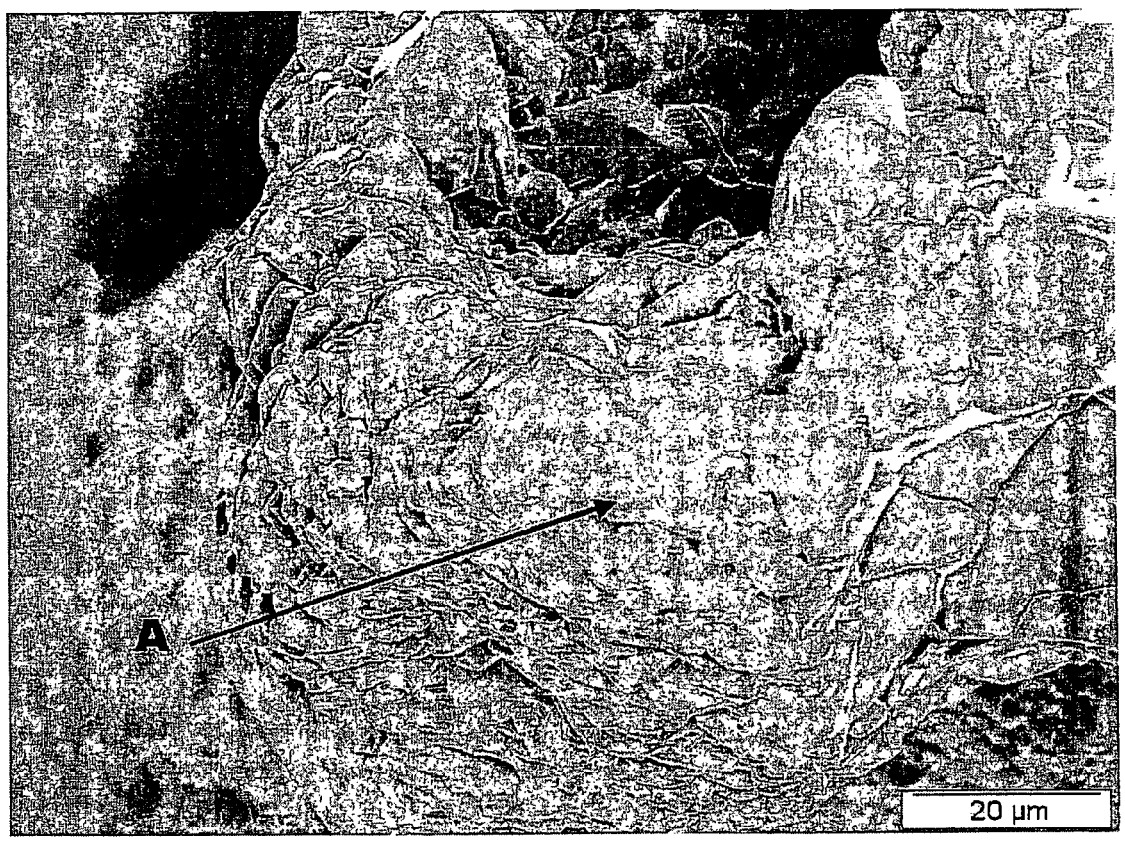

FIG. 3 represents a scanning electron microscope image of a particle of a powdery sugar composition obtained by the process according to the invention from pure sucrose.

The arrow A represents large crystals larger than 5 μm.

Figure 4:
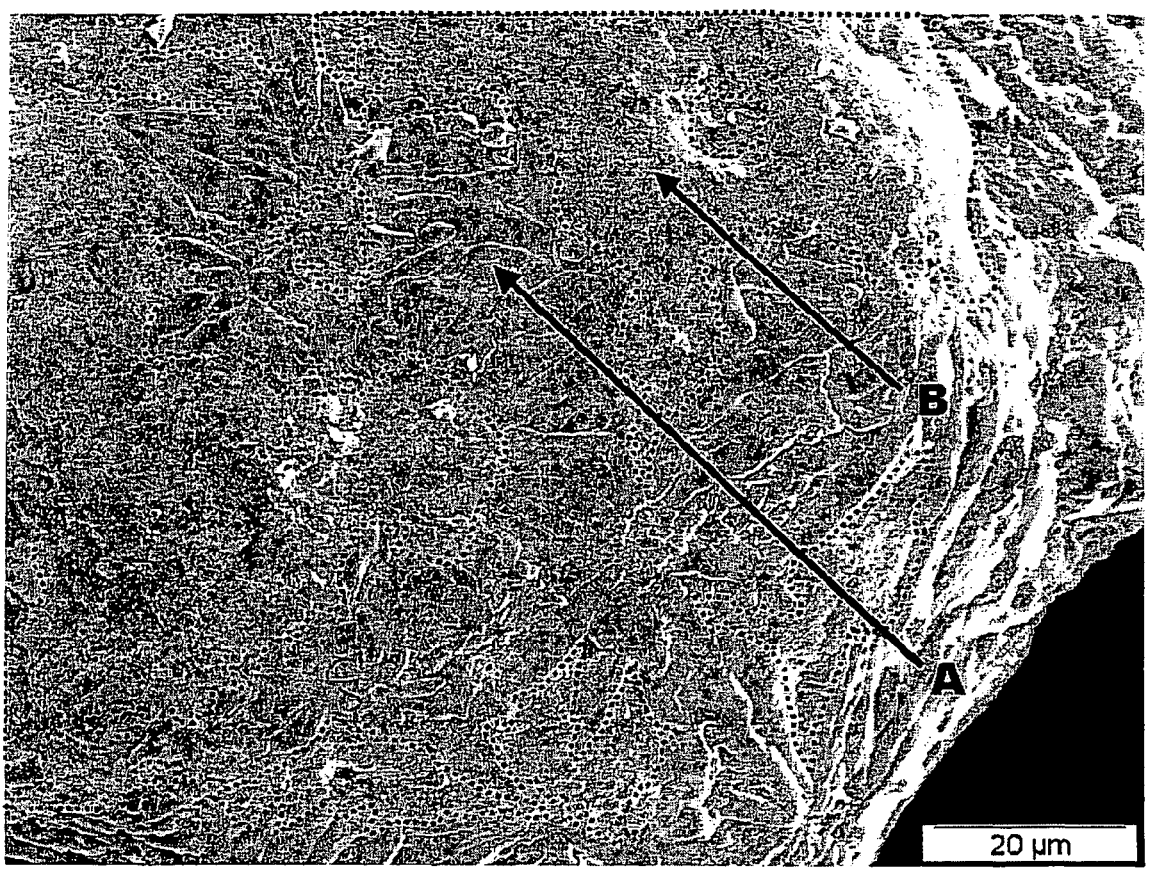

FIG. 4 represents a scanning electron microscope image of a particle of a powdery sugar composition obtained by the process according to the invention from a mixture comprising 95% of sucrose, 2.5% of inverted sugar and 2.5% of maltodextrins.

The arrow A represents large crystals larger than 5 μm and the arrow B indicates small crystals smaller than 5 sm.

Figure 5:
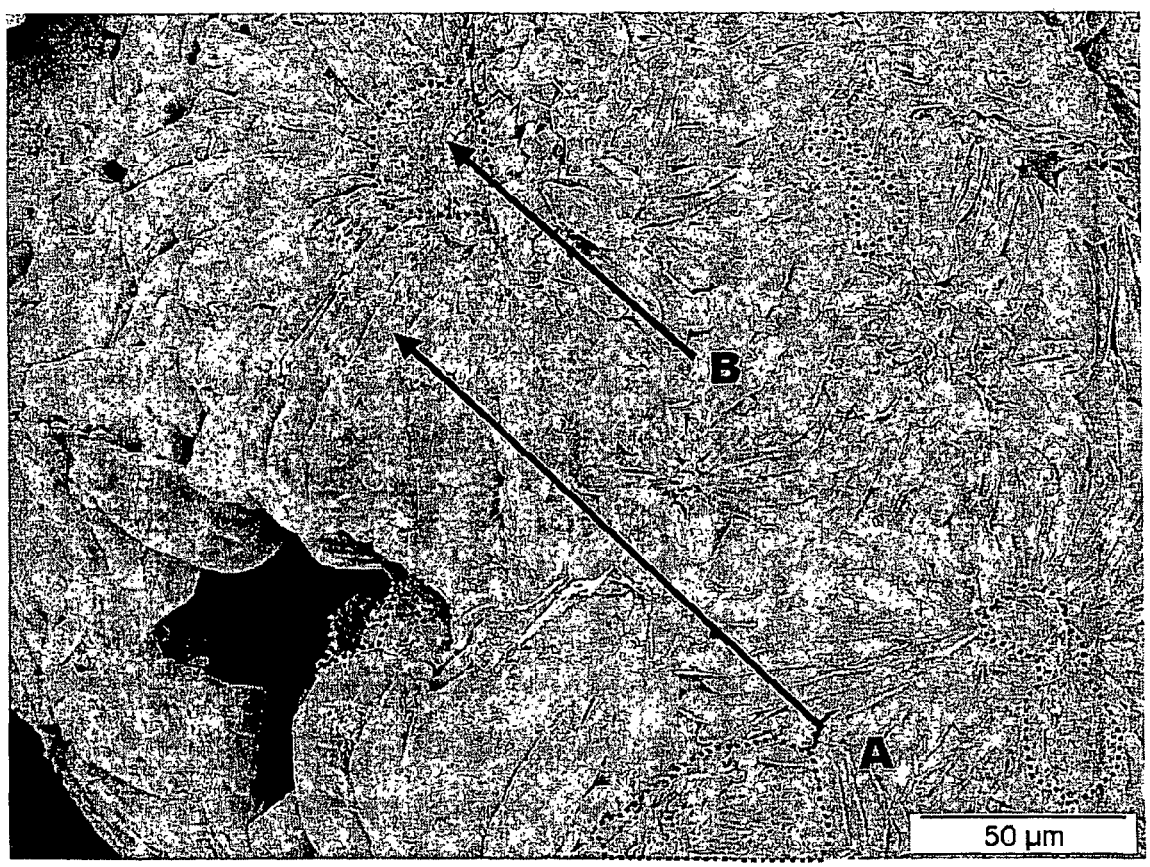

FIG. 5 represents a scanning electron microscope image of a particle of a powdery sugar composition obtained by the process according to the invention from a mixture comprising 95% of sucrose and 5% of glucose syrup.

The arrow A represents large crystals larger than 5 μm and the arrow B indicates small crystals smaller than 5 μm.

FIGS. 6 to 9 show the characteristics of tablets obtained according to the following mechanism:

Before the compression phase, the powders are mixed 0.5% or 0.25% with magnesium stearate (lubricant) for three minutes in a Gericke mixer under identical climatic conditions for all the powders.

A Korsch tablet press, model PH103/DMS was used, which comprises three punches. The rotation rate of the carrousel carrying the punches can reach 80 rpm and the compression forces can reach 30 kN.

This machine comprises an acquisition system of the compression and ejection forces.

For round flat tablets, 11 mm in diameter, the compression protocol is as follows:

| Powders produced | Rotation rate (rpm) | 40 |
|---|---|---|
| | Forces (kN) | 5 to 30 |

| Reference powders | Minimum rotation rate (rpm) | 40 |
|---|---|---|
| | Maximum rotation rate (rpm) | 80 |
| | Forces (kN) | 5 to 30 |

Figure 6:
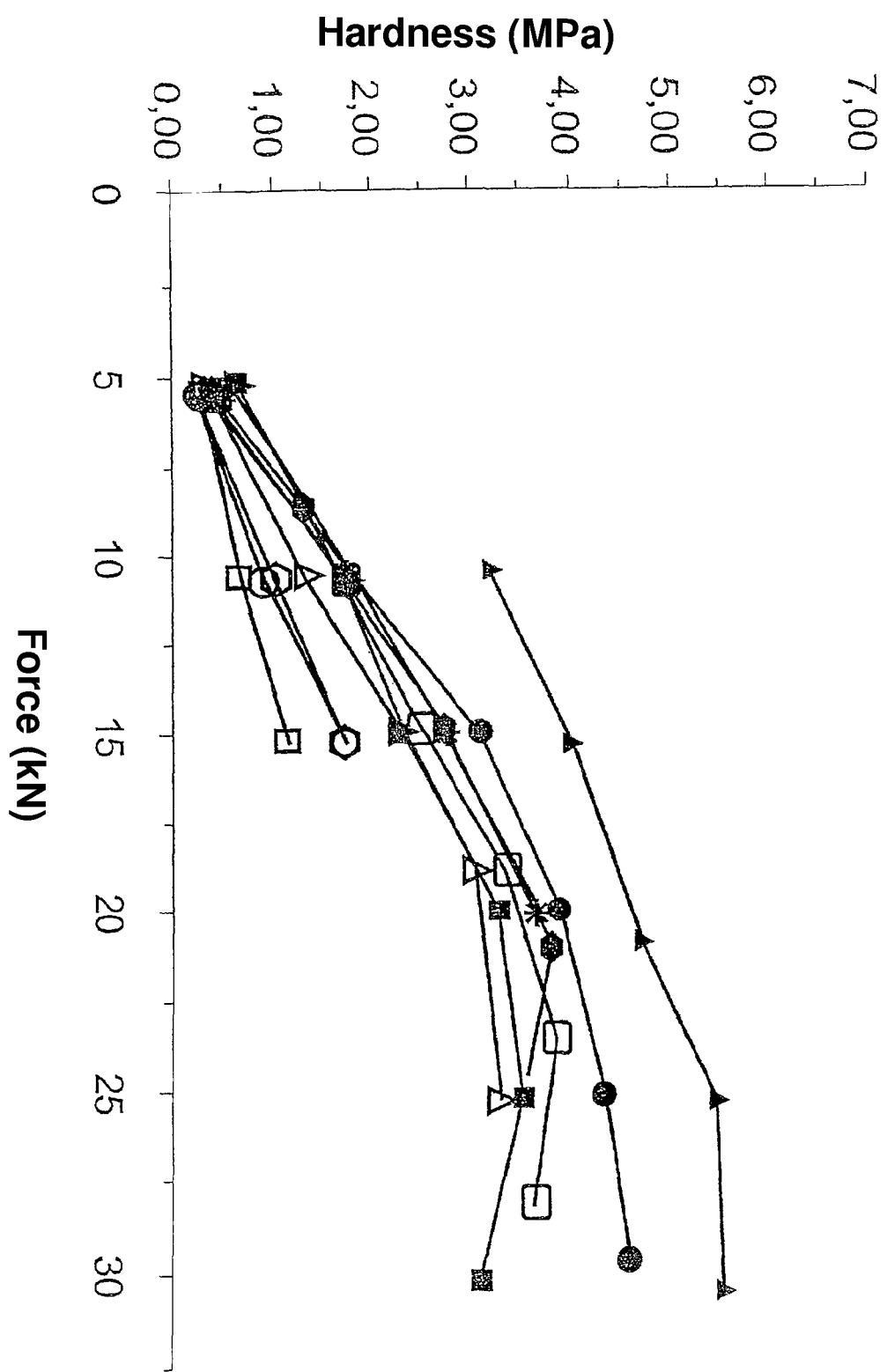

FIG. 6 represents comparative curves of the hardness in MPa (y-axis) of the tablets obtained during pilot tests, from different sugar compositions, depending on the compression force in kN (x-axis).

The curve with the white squares corresponds to tablets obtained from a dry mixture containing 95% of sucrose and 5% of maltodextrins (the sucrose and the maltodextrins having been spray-dried separately before being mixed), the curve with the white hexagons corresponds to tablets obtained from a dry mixture containing 95% of sucrose and 5% of glucose and the curve with the white circles corresponds to tablets obtained from a dry mixture containing 95% of sucrose and 5% of polyvinyl pyrolidone. The curve with the black squares corresponds to tablets obtained from Nutab® compressible sugar and the curve with the white rectangles to tablets obtained from Dipac® compressible sugar.

The curve with the white triangles corresponds to tablets obtained according to the process of the invention from a mixture comprising 95% of sucrose, 2.5% of maltodextrins and 2.5% of glucose. The curve with the black circles corresponds to tablets obtained according to the process of the invention, from a mixture comprising 95% of sucrose and 5% of maltodextrins and the curve with the black triangles corresponds to tablets obtained according to the process of the invention, from a mixture comprising 95% of sucrose, 2.5% of maltodextrins and 2.5% of inverted sugar.

When comparing the different curves in this figure, it is found that, when using the same initial compositions, a non-compressible powder is obtained when the different constituents of the mixture are mixed dry, whereas when the mixture is spray-dried, a compressible powder is obtained.

In fact, it is found that the compositions obtained from dry mixing do not make it possible to obtain tablets when the compression force is greater than 15 kN whereas, when this force is lower than or equal to 15 kN, the hardness of the tablets obtained is very inadequate (from 0.5 to 1.5 MPa). Consequently, these compositions do not constitute compressible powders.

It is also found that the hardness of the tablets obtained from the products of the prior art reaches a ceiling when the compression force increases, and reduces for the highest compression forces, whereas the tablets obtained according to the process of the present invention have the highest levels of hardness.

Figure 7:
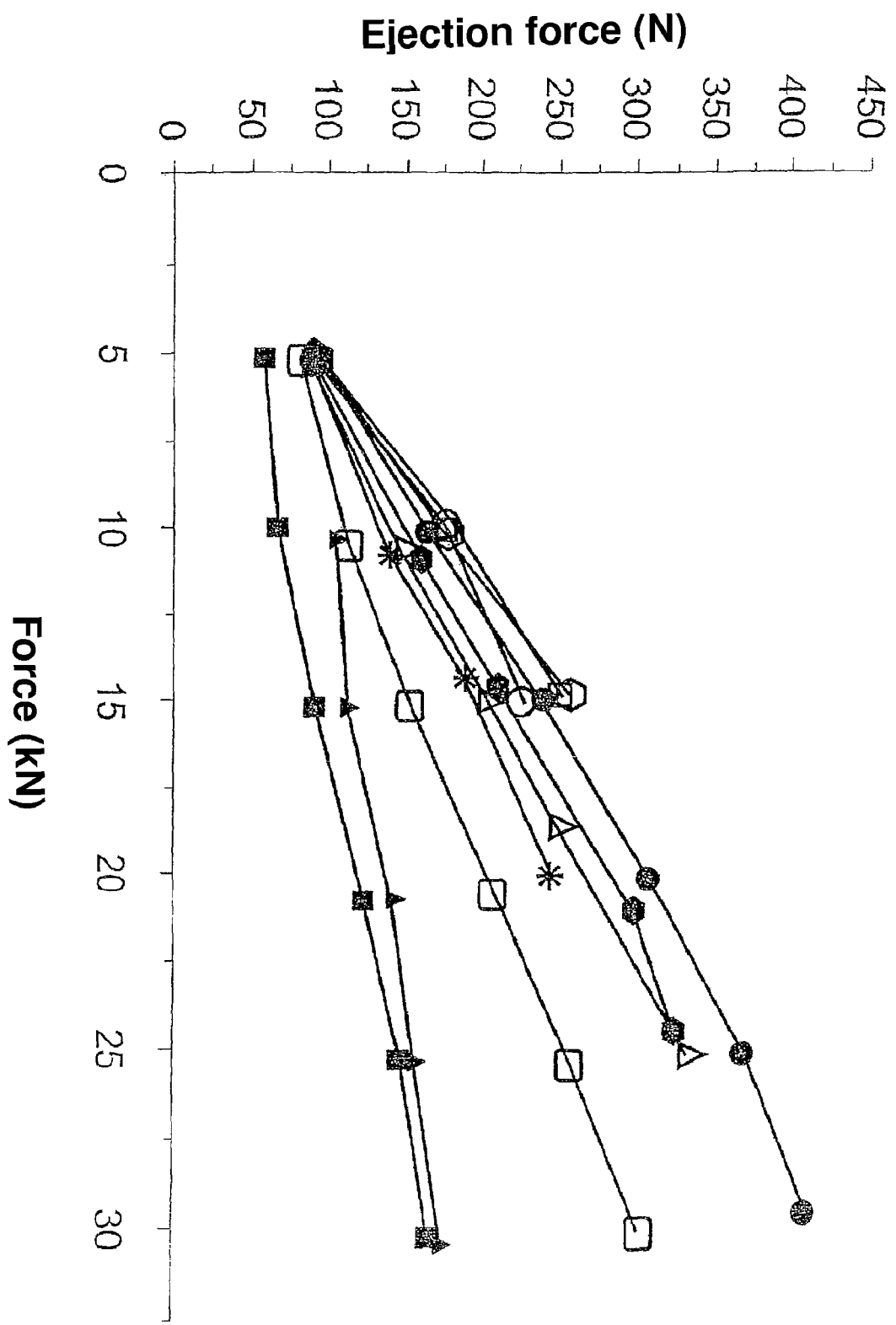

FIG. 7 represents comparative curves of the ejection force in N (y-axis) to which tablets obtained, during pilot tests, from different sugar compositions correspond, depending on the compression force in kN (x-axis).

The curve with the white squares corresponds to tablets obtained from dry mixing of 95% of sucrose and 5% of maltodextrins (the sucrose and the maltodextrins having been spray-dried separately before being mixed), the curve with the white hexagons corresponds to tablets obtained from dry mixing of 95% of sucrose and 5% of glucose and the curve with the white circles corresponds to tablets obtained from dry mixing of 95% of sucrose and 5% of polyvinyl pyrolidone. The curve with the black squares corresponds to tablets obtained from Nutab® compressible sugar and the curve with the white rectangles to tablets obtained from Dipac® compressible sugar.

The curve with the white triangles corresponds to tablets obtained according to the process of the invention from a mixture comprising 95% of sucrose, 2.5% of maltodextrins and 2.5% of glucose. The curve with the black circles corresponds to tablets obtained according to the process of the invention, from a mixture comprising 95% of sucrose and 5% of maltodextrins and the curve with the black triangles corresponds to tablets obtained according to the process of the invention, from a mixture comprising 95% of sucrose, 2.5% of maltodextrins and 2.5% of inverted sugar. The curve with the black stars corresponds to tablets obtained according to the process of the invention, from a mixture comprising 95% of sucrose, 2.5% of maltodextrins and 2.5% of polyvinyl pyrolidone. The curve with the black hexagons corresponds to tablets obtained according to the process of the invention, from a mixture comprising 95% of sucrose and 5% of glucose.

The curves in FIG. 7 are to be analyzed in parallel with the curves in FIG. 6. In fact, the ejection force and the hardness cannot be dissociated. More precisely, a low hardness is not compatible with a high ejection force as the tablets would risk being broken during their ejection. On the other hand, tablets with a high level of hardness can withstand a greater ejection force. Thus, the tablets obtained according to the process of the invention have a better hardness—force of ejection relationship, than tablets of the prior art.

Figure 8:
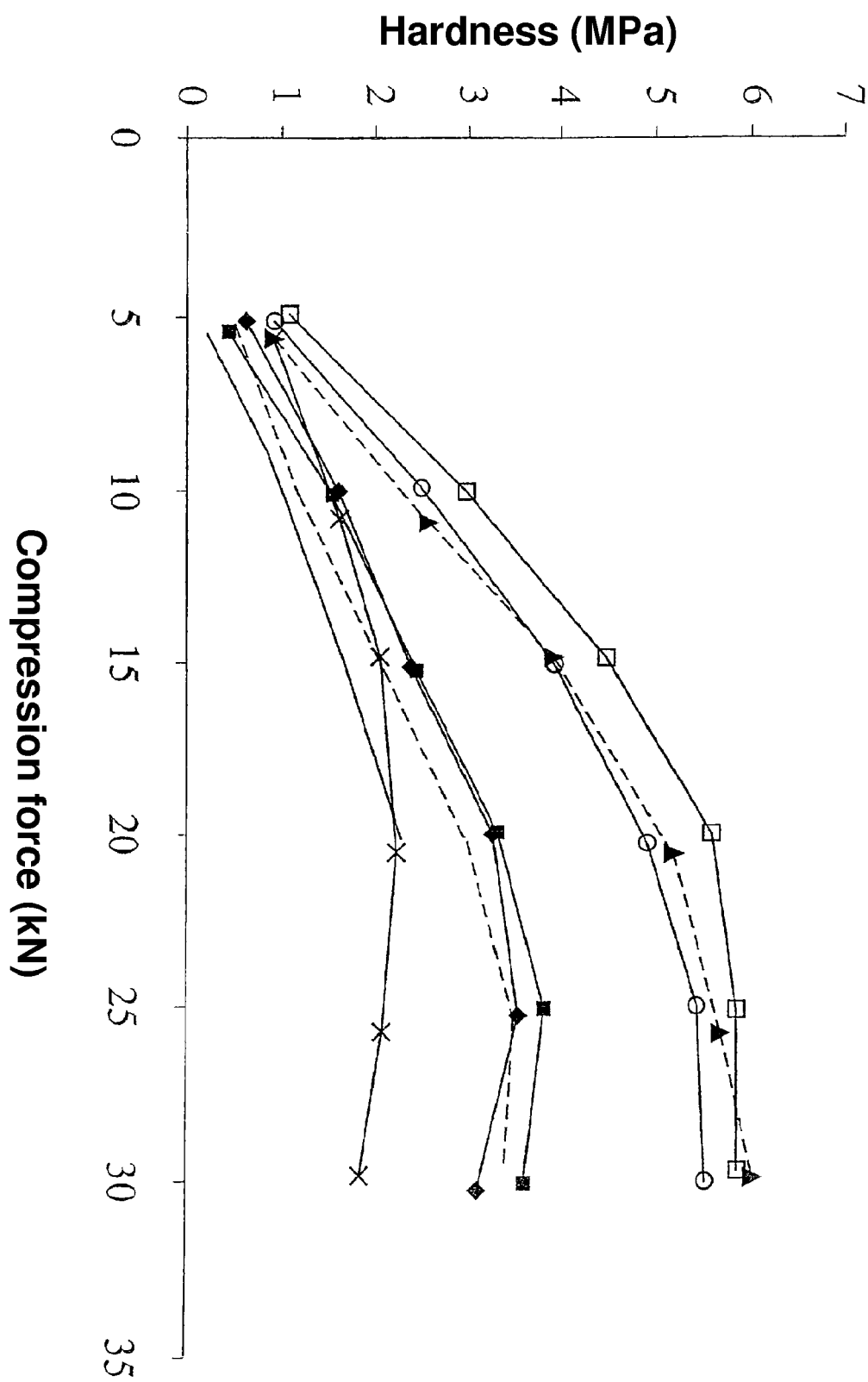

FIG. 8 represents comparative curves of the hardness in MPa (y-axis) of the tablets obtained during industrial-scale tests, from different sugar compositions, depending on the compression force in kN (x-axis).

The solid curve with the black crosses corresponds to the tablets obtained according to the process described in the patent GB 1,350,098. The solid curve corresponds to the tablets obtained from pure sucrose. The solid curve with black diamonds corresponds to the tablets obtained from Nutab® sugar, the dotted curve to the tablets obtained from Microtal sugar (commercial product; European version of Dipac® sugar) and the solid curve with the black squares to the tablets obtained from Dipac® sugar.

The solid curve with the white circles corresponds to the tablets obtained according to the process of the invention, from the mixture comprising 95% of sucrose, 2.27% of maltodextrins, 1.82% of inverted sugar and 0.9% of caramel, the dotted curve with the black triangles to the tablets obtained according to the process of the invention, from the mixture comprising 95% of sucrose, 2.5% of maltodextrins, 2.5% of inverted sugar and 0.014% of colorant and the solid curve with the white squares to the tablets obtained according to the process of the invention, from the mixture comprising 95% of sucrose, 2.5% of maltodextrins and 2.5% of inverted sugar.

The powders obtained according to the process of the invention are more successful than those obtained from the products on the market. In fact, the hardness of the tablets obtained from the compressible sugars on the market reaches a maximum included between 3.4 and 3.8 MPa for a very high compression force (25 kN) whereas the tablets obtained according to the process of the invention have higher levels of hardness (from 4.9 to 5.7 MPa) for a lower compression force (only 20 kN).

It is also found that the products obtained from pure sucrose or according to the patent GB 1,350,098 are not compressible powders. In fact, the hardness of these tablets is much too low (lower than 2.5 MPa) for the starting powders to qualify as compressible powders.

In order to limit wear on the tablet press parts and to reduce the force that it is necessary to apply to the tablets for their ejection, it is desirable to use a moderate compression force. Thus, for a compression force of 15 kN, the curves in FIG. 8 show that the hardness of the tablets obtained according to the process of the invention is twice that of the tablets obtained from the products of the prior art (from 4 to 4.7 MPa compared with 2 to 2.3 MPa). This therefore illustrates the much improved performance of the sugar compositions of the invention with respect to their compressibility.

Figure 9:
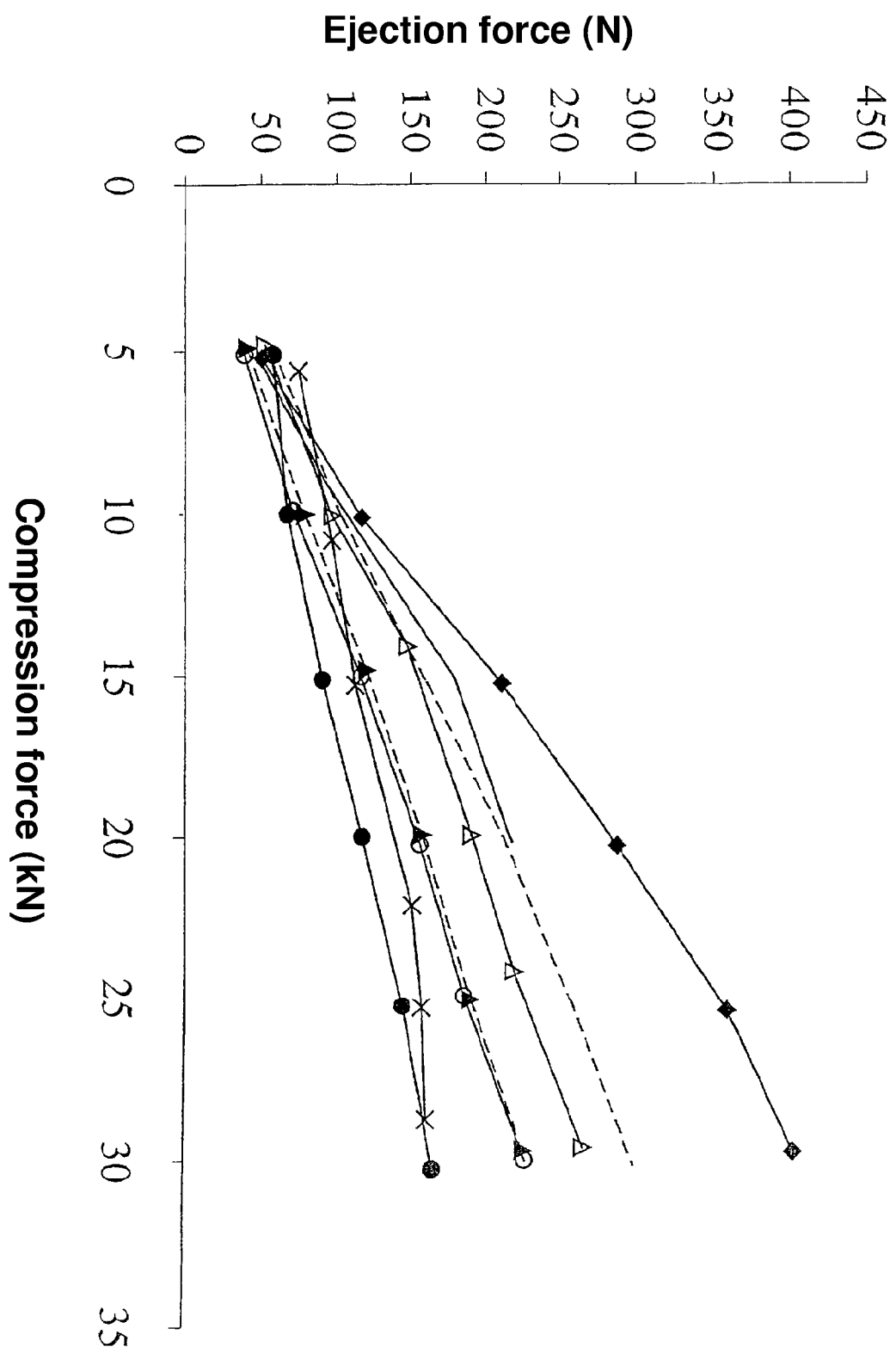

FIG. 9 represents comparative curves of the ejection force in N (y-axis) to which correspond tablets obtained during industrial-scale tests, from different sugar compositions, depending on the compression force in kN (x-axis).

The solid curve with the black crosses corresponds to the tablets obtained according to the process described in the patent GB 1,350,098. The solid curve corresponds to the tablets obtained from pure sucrose. The solid curve with the black circles corresponds to the tablets obtained from Nutab® sugar, the solid curve with the black diamonds to the tablets obtained from Microtal sugar and the dotted curve to the tablets obtained from Dipac® sugar.

The solid curve with the white circles corresponds to the tablets obtained according to the process of the invention, from the mixture comprising 95% of sucrose, 2.27% of maltodextrins, 1.82% of inverted sugar and 0.9% of caramel, the solid curve with the white triangles to the tablets obtained according to the process of the invention, from the mixture comprising 95% of sucrose, 2.5% of maltodextrins, 2.5% of inverted sugar and 0.014% of colorant and the dotted curve with the black triangles to the tablets obtained according to the process of the invention, from the mixture comprising 95% of sucrose, 2.5% of maltodextrins and 2.5% of inverted sugar.

FIGS. 8 and 9 must be linked together in order to consider the hardness—force of ejection relationship of the tablets. The tablets obtained according to the process of the invention require moderate ejection forces (see FIG. 9) whereas their hardness levels (see FIG. 8) are very high. This does not apply to the tablets obtained from the products of the prior art which require moderate to very high ejection forces, for appreciably lower levels of hardness.

EXAMPLE 1

Figure 1:
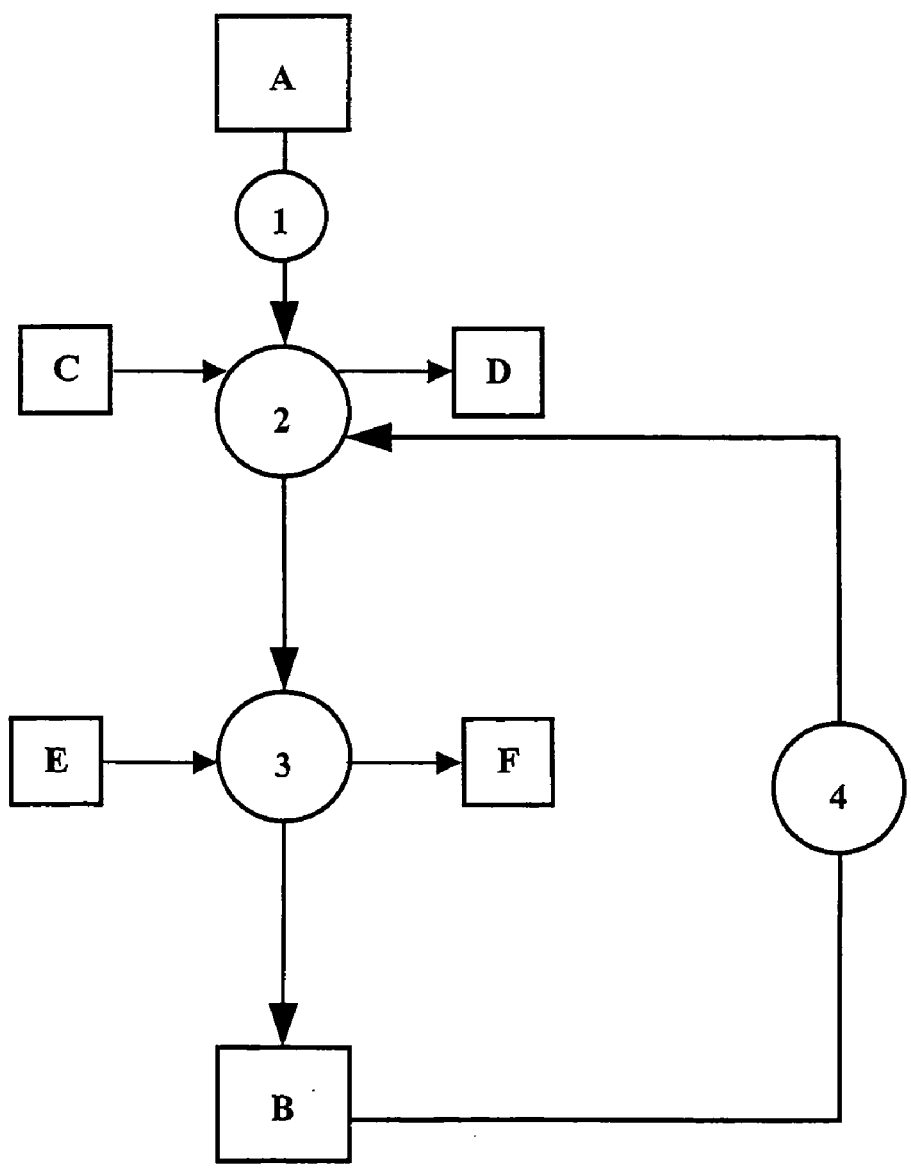
FIG. 1 represents a flow diagram of the process according to the invention. Rectangle A corresponds to the initial solution, the temperature of which is comprised between 50 and 90° C., comprising sucrose and at least one anti-crystallizing agent, said initial solution having a percentage of dry matter comprised between 50 and 70%. Rectangle B corresponds to the final product, i.e. the powder or dried powdery composition, obtained according to the process of the present invention. Circle 1 corresponds to the atomization stage of the process according to the present invention, Circle 2 to the drying stage, Circle 3 to the maturation stage and Circle 4 to the recycling stage of the powder as crystallization primer. Rectangle C corresponds to the inlet of the air used during the drying stage, at a temperature comprised between 120 and 200° C. and Rectangle D to the outlet of the air after the drying stage, at a temperature comprised between 80 and 95° C. Rectangle E corresponds to the inlet of the air used during the maturation stage, at a temperature comprised between 40 and 60° C. and Rectangle F to the outlet of the air after this maturation stage, at a temperature comprised between 35 and 60° C.
Figure 2:
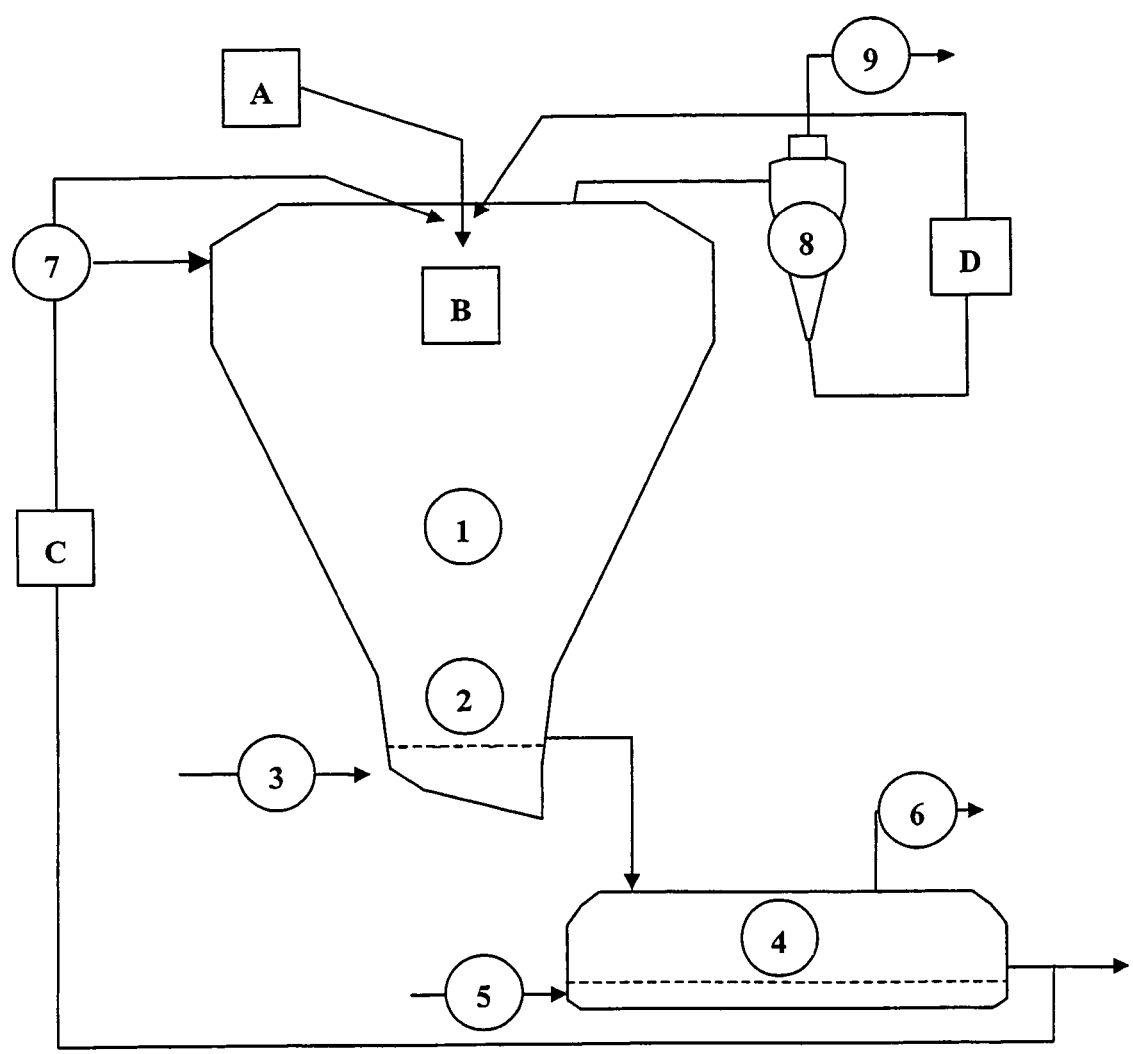
FIG. 2 represents a diagram of an MSD (multi-stage dryer) drying tower.

The equipment used (see FIG. 2) is a multi-stage spray-drying tower (MSD) which makes it possible to recycle the fine particles to the atomization zone. The drops formed by atomization are dried in a chamber by hot air and the powdery composition or powder thus obtained is maintained in a fluidized bed situated at the bottom of the installation. The product leaving the fluidized bed is matured in a second fluidized bed. This stage allows the evacuation of the humidity released naturally by the powder, up to a residual humidity of less than 1%.

A solution of sucrose, inverted sugar and maltodextrins having one of the compositions indicated hereafter is spray-dried by means of a high-pressure nozzle. The air inlet temperature is adjusted for an outlet temperature of 85 to 90° C. The air inlet temperature of the first fluidized bed is adjusted in order to maintain the powder at a temperature of 40° C. The maturation phase is carried out with dry air and makes it possible to reduce the residual humidity of the powder from a few % to values below 1%.

The drying is carried out under the following conditions:

Recycling of the fine particles: to the atomization zone

Recycling of the powder with a worm feeder: quantity 20% by weight with respect to the dry matter of the solution entering Atomization nozzle: high pressure (150-300 bars)

Flow rate of the powder: approximately 300 kg/hour

Flow rate of the starting solution (syrup): 400 l/hour

Temperature of the solution: 60° C., 60% of dry extract

Hot air inlet temperature: 145° C.

Composition of the solutions (the figures indicated are percentages by weight with respect to the total weight of the composition):

Sucrose/inverted sugar/maltodextrins (95/2.5/2.5)

Sucrose/inverted sugar/maltodextrins/colorant (95/2.5/2.5/0.014)

Sucrose/inverted sugar/maltodextrins/caramel (95/2.27/1.82/0.9)

Tower outlet temperature: 85-90° C.

The characteristics of the powders produced according to this Example 1 are given below in Table 1.

TABLE 1

| Product | Humidity (%) | Average granulometry (μm) | Flowability (seconds for 100 g) | Non-compacted density (g/cm$^3$) | Compacted density (g/cm$^3$) | Carr Index (%) |
|---|---|---|---|---|---|---|
| Pure sucrose | 0.74 | 285 | 13.6 | 0.45 | 0.64 | 30 |
| S + mdx + IS + colorant | 0.90 | 358 | 11.2 | 0.55 | 0.63 | 13 |
| S + mdx + IS + caramel | 0.84 | 306 | 10.5 | 0.55 | 0.64 | 14 |
| S + mdx + IS | 0.90 | 380 | 10.5 | 0.58 | 0.64 | 9 |

The line "S+mdx+IS+colorant" corresponds to a mixture comprising 95% of sucrose, 2.5% of maltodextrins, 2.5% of inverted sugar and 0.014% of colorant.

The line "S+mdx+IS+caramel" corresponds to a mixture comprising 95% of sucrose, 2.27% of maltodextrins, 1.82% of inverted sugar and 0.9% of caramel.

The line "S+mdx+IS" corresponds to a mixture comprising 95% of sucrose, 2.57% of maltodextrins and 2.5% of inverted sugar.

The Carr index makes it possible to define the flowability of a powder and corresponds to the following expression:

$$\text{Carr index} = \frac{\text{compacted density} - \text{non-compacted density}}{\text{compacted density}}$$

The flowability is directly correlated to the Carr index according to the following table:

| Carr Index | Flowability |
|---|---|
| 5 to 11% | Excellent |
| 12 to 17% | Good |
| 18 to 22% | Average |
| 23 to 28% | Passable |
| 29 to 34% | Poor |
| 35 to 40% | Very poor |
| higher than 40% | Very, very poor |

EXAMPLE 2

The equipment used is a multi-stage spray-drying tower (MSD) which makes it possible to recycle the fine particles to the atomization zone. Its operating principle is identical to the installation mentioned in the previous example.

The starting solution having one of the compositions indicated hereafter is atomized with a bi-fluid nozzle. The fine particles are recycled to the fluidized bed. Part of the powder produced (20%) is recycled by means of a dosing device to the atomization nozzle. The product thus dried is matured either in a fluidized bed, or in a granulator.

The drying is carried out according to the following conditions:
Recycling of the fine particles: to the fluidized bed (Circle 2 in FIG. 2)
Recycling of the powder with a dosing device: 20% by weight to the nozzle
Atomization nozzle: bi-fluid
Flow rate of powder: approximately 7 kg/hour
Flow rate of the starting solution (syrup): 10 l/hour
Temperature of the solution: 60° C., 60% of dry extract
Hot air inlet temperature: 170° C.
Composition of the solutions (the figures indicated are percentages by weight with respect to the total weight of the composition):
Sucrose/glucose syrups (95/5)
Sucrose/maltodextrins (95/5)
Sucrose/inverted sugar/maltodextrins (95/2.5/2.5)
Sucrose/inverted sugar/maltodextrins/colorant (95/2.5/2.5/0.014)
Sucrose/inverted sugar/maltodextrins/caramel (95/2.27/1.82/0.9)
Tower outlet temperature: 85-90° C.

The invention claimed is:

1. A compressible powdery sugar composition, comprising:
spray-dried particles having hollow forms being made up of a skeleton formed by a first type of crystal forming interstices in which is situated a second type of crystal, and said first type of crystal being a size greater than approximately 5 μm and said second type of crystal being lower than 5 μm, and
said spray-dried particles comprising:
(i) approximately 90% to approximately 99% by weight of sucrose,
(ii) at least one anti-crystallizing agent amounting to approximately 1% to approximately 10% by weight, said anti-crystallizing agent being selected from the group consisting of inverted sugar, maltodextrins and oligosaccharides, and intense sweetening agents being excluded from said anti-crystallizing agent, and
(iii) optional additives selected from the group consisting of flavorings, colorants and active ingredients,
wherein said composition has an apparent density between approximately 0.6 and approximately 0.8 g/cm$^3$.

2. The powdery sugar composition according to claim 1, further comprising:
approximately 0.1% to approximately 1% by weight of a lubricant selected from the group consisting of fatty substances, sodium benzoate and colloidal silica.

3. The powdery sugar composition according to claim 2, wherein,
said powdery composition is compressible to a hardness of greater than approximately 2 MPa, as measured for a compression force greater than approximately 10 kN, and has an ejection force response of approximately 80 to approximately 180 N, as measured for a compression force comprised from approximately 15 to approximately 20 kN.

4. The powdery sugar composition according to claim 1, wherein,
said powdery composition is compressible to a hardness of greater than approximately 2 MPa, as measured for a compression force greater than approximately 10 kN, and has an ejection force response of approximately 80 to approximately 180 N, as measured for a compression force comprised from approximately 15 to approximately 20 kN.

5. The powdery sugar composition according to claim 1, wherein said powdery composition has a residual humidity level equal to or lower than 1% by weight.

6. A granule composition, comprising:
granules formed by particles according to claim 1 agglomerated together, said granules having an average size of approximately 40 to approximately 350 μm.

7. A composition comprising the compressible powdery sugar composition according to claim 1, wherein said composition is prepared as tablets or a confectionery.

* * * * *